US006615256B1

(12) United States Patent
van Ingen et al.

(10) Patent No.: US 6,615,256 B1
(45) Date of Patent: Sep. 2, 2003

(54) QUORUM RESOURCE ARBITER WITHIN A STORAGE NETWORK

(75) Inventors: Catharine van Ingen, Berkeley, CA (US); Norbert P. Kusters, Woodinville, WA (US); Rod N. Gamache, Issaquah, WA (US); Robert D. Rinne, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/449,579

(22) Filed: Nov. 29, 1999

(51) Int. Cl.[7] ................................................ G06F 15/16
(52) U.S. Cl. ...................................................... 709/220
(58) Field of Search ................................. 709/220, 223

(56) References Cited

U.S. PATENT DOCUMENTS 5,822,531 A 10/1998 Gorczyca et al. ...... 395/200.51
6,253,240 B1 * 6/2001 Axberg et al. .............. 709/223

OTHER PUBLICATIONS

Gelb, J.P., "System–Managed Storage" *IBM Systems Journal*, vol. 28, No. 1, SP000054276, ISSN: 0018–8670, 1989, pp. 77–103.

Veritas Software Corporation: "Veritas Volume Manager Administrator's Reference Guide Release 3.0.1" *Veritas Volume Manager for Solaris Documentation*, May 1999, paged i–ii, 115–148, XP002190199; <URL:ftp://ftp.support.veritas.com/pub/support/products/VolumeManager_UNIX/vm301_ref_236742.pdf>.

"XFS: A Next Generation Journalled 64–Bit Filesystem With Guaranteed Rate I/O", http://www–europe.sgi.com/Technology/xfs–whitepaper.html, Silicon Graphics—XFS White Paper, 1–20, (Mar. 15, 1999).

* cited by examiner

*Primary Examiner*—David Y. Eng
(74) *Attorney, Agent, or Firm*—Workman, Nydegger & Seeley (57) ABSTRACT

The invention provides a method and system for arbitrating for ownership of a logical quorum resource, such as a logical quorum volume, comprising one or more physical quorum resources so as to form a storage network having a plurality of storage devices. Arbitration and volume management responsibilities are cleanly divided between cluster management software and volume management software. The cluster management software handles the arbitration process without knowing the details of how the logical quorum resource is formed. The volume management software handles the formation and management of the logical quorum volume without having details of the arbitration process.

22 Claims, 4 Drawing Sheets

QUORUM RESOURCE ARBITER WITHIN A STORAGE NETWORK

RELATED APPLICATIONS

This application is related to the following applications, all of which are filed on the same day and assigned to the same assignee as the present application: "Storage Management System Having Common Volume Manager"—Ser. No. 09/449,577, "Storage Management System Having Abstracted Volume Providers"—Ser. No. 09/450,364, "Volume Stacking Model"—Ser. No. 09/451,219, "Volume Configuration Data Administration"—Ser. No. 09/450,300, and "Volume Migration Between Volume Groups"—Ser. No. 09/451,220.

FIELD OF THE INVENTION

This invention relates generally to data storage devices, and more particularly to an arbitration mechanism for logical quorums resources within a storage network.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright © 1999, Microsoft Corporation, All Rights Reserved.

BACKGROUND OF THE INVENTION

As computer systems have evolved so has the availability and configuration of data storage devices, such as magnetic or optical disks. For example, these storage devices can be connected to the computer system via a bus, or they can be connected to the computer system via a wired or wireless network. In addition, the storage devices can be separate or co-located in a single cabinet.

A storage network is a collection of interconnected computing systems, referred to as nodes, operating as a single storage resource. A storage network allows a system to continue to operate during hardware or software failures, increases scalability by allowing nodes to be easily added and simplifies management by allowing an administrator to manage the nodes as a single system.

Cluster software exists on each node and manages all cluster-specific activity of a storage network. The cluster software often executes automatically upon startup of the node. At this time the cluster software configures and mounts local, non-shared devices. The cluster software also uses a 'discovery' process to determine whether other members of the storage network are operational. When the cluster software discovers an existing cluster, it attempts to join the cluster by performing an authentication sequence. A cluster master of the existing cluster authenticates the newcomer and returns a status of success if the joining node is authenticated. If the node is not recognized as a member then the request to join is refused.

If a cluster is not found during the discovery process, the node will attempt to form its own cluster. This process is repeated any time a node cannot communicate with the cluster to which it belongs. In conventional computing systems, nodes arbitrate for a physical "quorum resource", such as a disk, in order to form a storage network. In more recent systems, a quorum resource can be a logical resource, such as a volume, that includes one or more physical quorum resources. For example, a volume is a logical storage unit that can be a fraction of a disk, a whole disk, fractions of multiple disks or even multiple disks.

In conventional systems the responsibility and intelligence for determining ownership of a cluster, i.e. the implementing the arbitration process, is often distributed between several components and/or software modules. The responsibility for configuring and managing the underlying storage devices is often is often similarly distributed. This lack of clean division in responsibility creates difficulties when a given component or software module changes. Thus, there is a need in the art for a system that more cleanly separates the responsibilities of cluster arbitration from the cluster management from the responsibility of volume management and the underlying storage devices.

SUMMARY OF THE INVENTION

The above-mentioned shortcomings, disadvantages and problems are addressed by the present invention. Inventive cluster management software and volume management software execute on the nodes of a storage network and operate in cooperation with the underlying operating system in order to arbitrate for logical quorum resources such as a quorum volume. According to the invention, the cluster management software arbitrates for logical quorum resources and forms a storage network without having knowledge of the underlying physical quorum resources. In this fashion, the cluster management software is not hardware specific. In addition, the cluster management software need not be aware of how the logical quorum resource is formed from the underlying physical quorum resources. For example, the volume management software manages is solely responsible for forming and mounting the logical quorum volume. The volume management software performs volume management without having detailed knowledge of the arbitration process and the determination of ownership.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention can be practiced. These embodiments are described in sufficient detail to enable those skilled in the art to practice the invention, and it is to be understood that other embodiments can be utilized and that changes can be made without departing from the spirit or scope of the present invention. The following detailed description is, therefore, not to be taken in a limiting sense, and the scope of the present invention is defined only by the claims.

The detailed description is divided into four sections. In the first section, a glossary of terms is provided. In the second section, the hardware and the operating environment in conjunction with which embodiments of the invention can be practiced are described. In the third section, a system level overview of the invention is presented. Finally, in the fourth section, a conclusion of the detailed description is provided.

Definitions

Compromised—a status indicating that a fault tolerant volume is missing one or more disk or volume extents; for example, a mirror set with only one mirror currently available.

Configuration data—describes the mapping of physical resources to logical volumes.

Directed configuration—provider is explicitly provided with rules for choosing logical block remapping.

Disk platter—a subset of a diskpack, used for exporting or importing volumes from a diskpack.

Diskpack—a collection of logical volumes and underlying disks. A diskpack is the unit of transitive closure for a volume.

Export—Move a disk platter and all volumes contained on that platter out of one diskpack.

Exposed—a volume is exposed to an operating system when the volume has an associated volume name (drive letter) or mount point. The volume can be made available to a file system or other data store.

Free agent drive—a disk drive which is not a member of a disk pack. Free agent drives cannot contain logical volumes that are exposed.

Health—volume fault management status. A volume can be initializing, healthy, compromised, unhealthy, or rebuilding.

Healthy—containing or able to contain valid data.

Hot-spotting—temporary plexing of a volume or collection of volume extents.

Import—Move a disk platter and all volumes contained on that platter into one diskpack.

Initializing—a status indicating that a volume is rediscovering volume configuration.

LBN—logical block number.

Logical block mapping—relationship between the logical blocks exposed to the logical volume provider to those exposed by the same provider.

Logical quorum resource—a logical resource that is necessary to form a storage network. The logical quorum resource, such as a logical volume, comprises one or more physical quorum resources, such as a disk Logical volume—a logical storage unit that can be a fraction of a disk, a whole disk, a fraction of multiple disks or even multiple disks.

Logical volume provider—software which exposes logical volumes. A provider includes runtime services, configuration data, and management services.

Management service—software that executes only infrequently to perform volume configuration, monitoring or fault handling.

Mapped volume—a simple linearly logical block mapping which concatenates volumes to expose a single larger volume.

Mirrored volume—logical volume which maintains two or more identical data copies. Also termed RAID 1.

Parity striped volume—logical volume which maintains parity check information as well as data. The exact mapping and protection scheme is vendor-specific. Includes RAID 3, 4, 5, 6.

Plexed volume—dynamic mirror volume. Plexing is used to create a copy of a volume rather than to provide fault tolerance. The mirror is added to the volume with the intent of removal after the contents have been synchronized.

RAID—Redundant Array of Independent Disks.

Rebuilding—a status indicating that a previously compromised fault tolerant volume is resynchronizing all volume extent data.

Runtime service—software that executes on a per-IO request basis.

SCSI—Small-Computer Systems Interface.

Stacked volume—volume has been constructed by more than one logical block mapping operation. An example is a stripe set of mirror volumes. Stacking includes stripping, mapping, and plexing.

Striped volume—a logical block mapping which distributes contiguous logical volume extents across multiple volumes. Also termed RAID 0.

Unhealthy—a status indicating that a non-fault tolerant volume missing one or more disk or volume extents; data contained on unhealthy volumes must not be accessed.

Volume configuration stability—whether volume logical to physical mapping is undergoing change. A volume may be stable, extending, shrinking, plexing, or remapping.

Volume extent—a contiguous range of logical blocks contained on a volume. Volume extents are the smallest managed logical volume unit.

Volume status—current use of a volume by the system. A volume may be unused, hot spare, mapped, used, or unknown.

Hardware and Operating Environment

Figure 1:
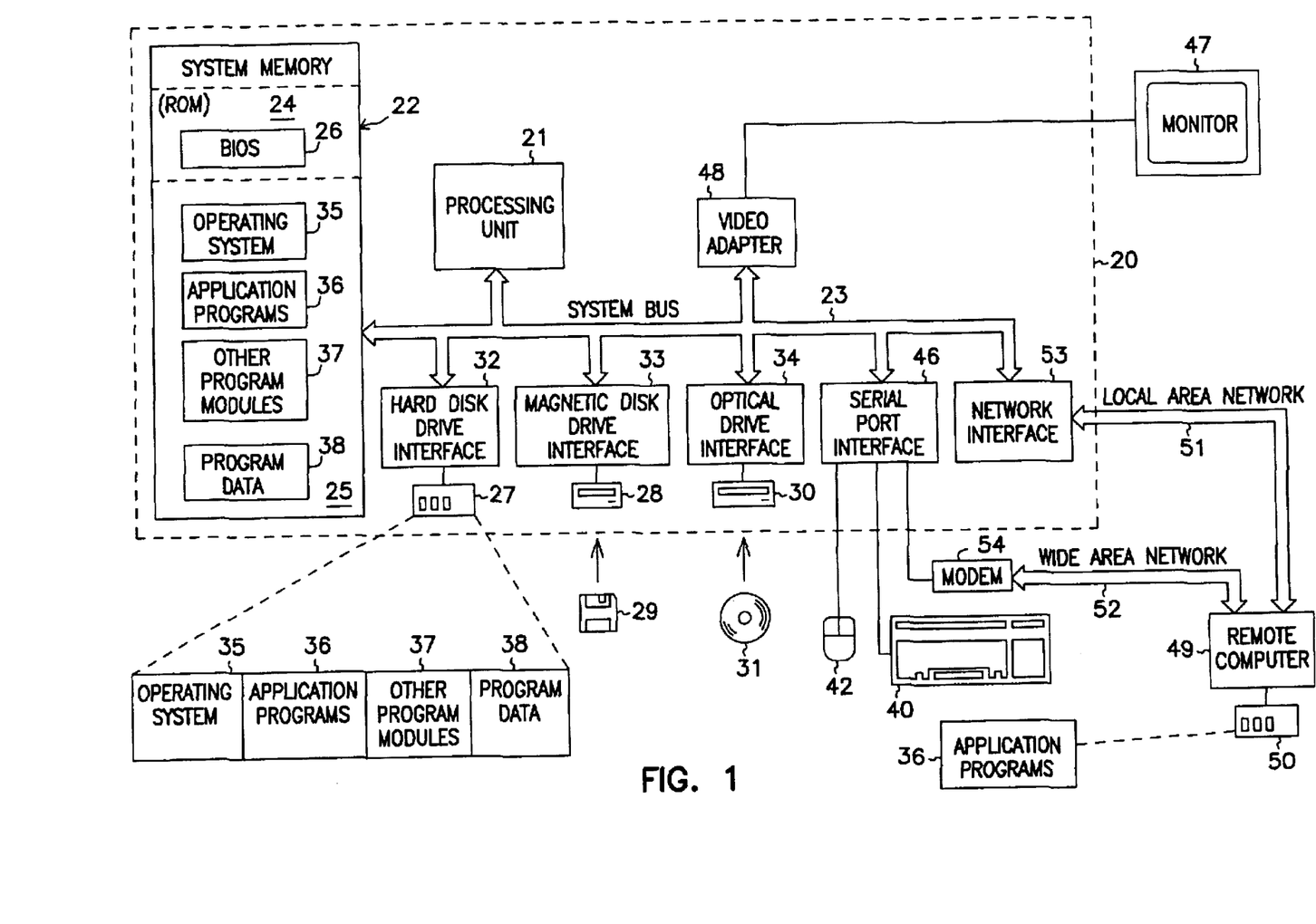
FIG. 1 shows a diagram of the hardware and operating environment in conjunction with which embodiments of the invention can be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc. that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules can be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 can be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable, optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk 27, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20, the local computer; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of, and communications devices for, establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple to other computers.

System Level Overview

Figure 2:
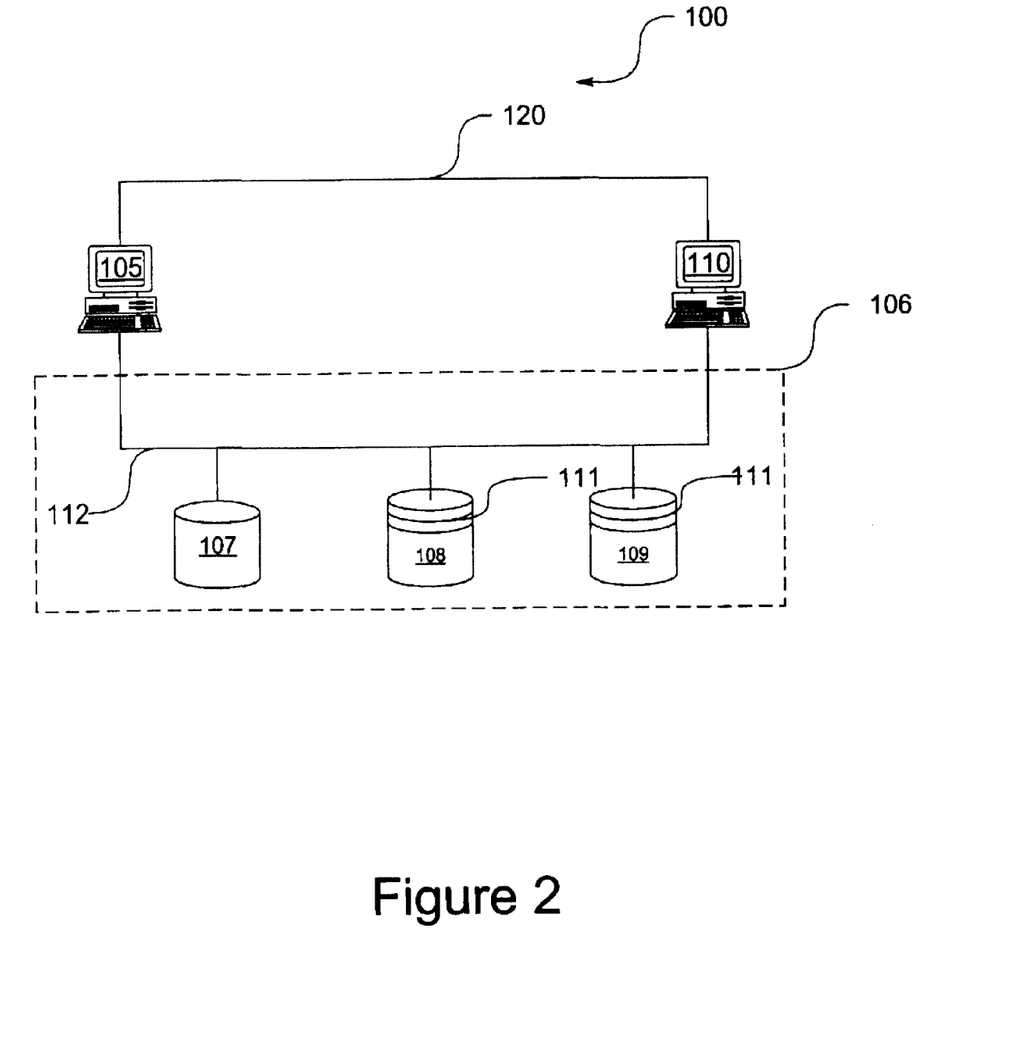
FIG. 2 is a block diagram illustrating a system-level overview of a storage network having two computing systems and a variety of storage devices.

FIG. 2 is a block diagram illustrating a system-level overview of storage network 100 that includes node 105 communicatively coupled to node 110 via network 120. Nodes 105 and 110 represent any suitable computing system such as local computer 20 or remote computer 49 depicted in FIG. 1.

Storage network 100 further includes storage subsystem 106 that comprise storage device 107, storage device 108, and storage device 109. These devices may be any suitable storage medium such as a single internal disk, multiple external disks or even a RAID cabinet. Storage subsystem 106 are coupled via bus 112, which is any suitable interconnect mechanism such as dual-connect SCSI ("Small-Computer Systems Interface"), fiber-channel, etc.

In order to form storage network 100, nodes 105 and 110 arbitrate for a logical quorum resource such as a quorum volume. In FIG. 2 the logical quorum resource is illustrated as a quorum volume that is collectively formed by physical quorum resources 111, which in this embodiment are data storage extents within data storage device 108 and data storage device 109. If either node 105 or 110 is successful at obtaining ownership of all physical quorum resources 111, the successful node may form storage network 100. As described below, inventive cluster management software and volume management software execute on each node and resolve situations where ownership of physical quorum resources 111 is split between nodes 105 and 110. On each node, the cluster management software and the volume management software cooperate with the underlying operating system to form storage network 100. As illustrated below, arbitration and management responsibilities are divided between the cluster management software and the volume management software such that cluster management software handles the arbitration process without knowing the details of volume management and storage subsystem 106. The volume management software handles the configuration and management of storage subsystem 106 without knowing how storage network 100 is formed.

Figure 3:
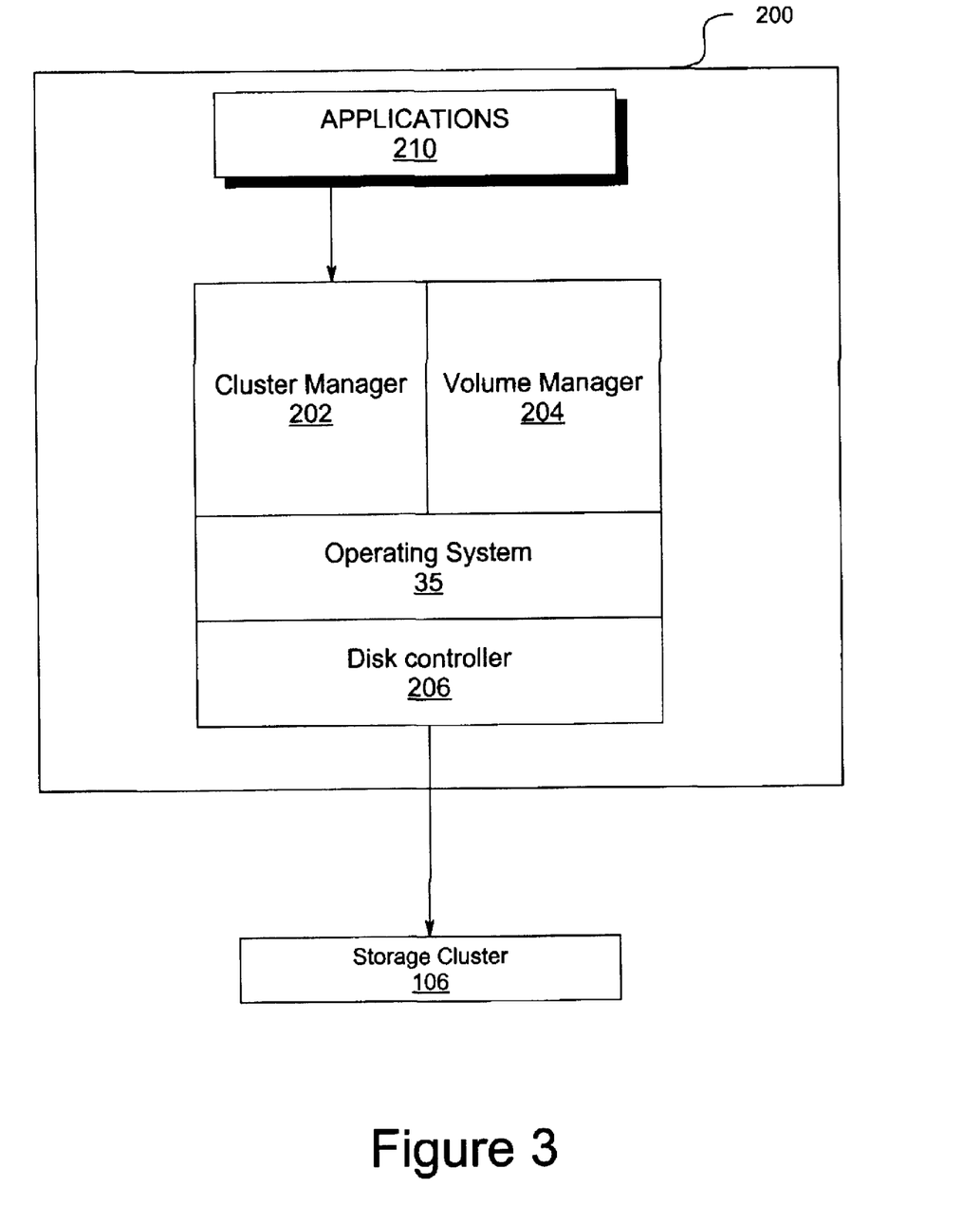
FIG. 3 is a block diagram illustrating one embodiment of a software system having cooperating software components that cleanly separates the responsibilities of cluster arbitration from the management of volumes and the underlying storage devices.

FIG. 3 is a block diagram illustrating one embodiment of a node 200, such as node 105 or node 110 of FIG. 2, in which various cooperating software components carryout the inventive arbitration technique. Within node 200, cluster manager 202 oversees all cluster specific activity and communicates to bus 112 (FIG. 2) of storage subsystem 106 via disk controller 206. As a cluster master, cluster manager 202, volume manager 204 and operating system 35 cooperatively manage the quorum volume for storage network 100 and the corresponding physical quorum resources 111. More specifically, cluster manager 202 handles the arbitration process without knowing the details of volume management and storage subsystem 106. Volume manager handles all volume mapping and the configuration of storage subsystem 106 of storage network 100. Disk controller 206 handles all communications with storage subsystem 106 and may implement one of a variety of data communication protocols such as SCSI, IP, etc. Applications 210 represent any user-mode software module that interacts with storage network 100. The system level overview of the operation of an exemplary embodiment of the invention has been described in this section of the detailed description.

Methods of an Exemplary Embodiment of the Invention

In the previous section, a system level overview of the operation of an exemplary embodiment of the invention was described. In this section, the particular methods performed by a computer executing an exemplary embodiment are described by reference to a series of flowcharts. The methods to be performed by a computer constitute computer programs made up of computer-executable instructions. Describing the methods by reference to a flowchart enables one skilled in the art to develop such programs including such instructions to carry out the methods on suitable computers (the processor of the computers executing the instructions from computer-readable media).

Figure 4:
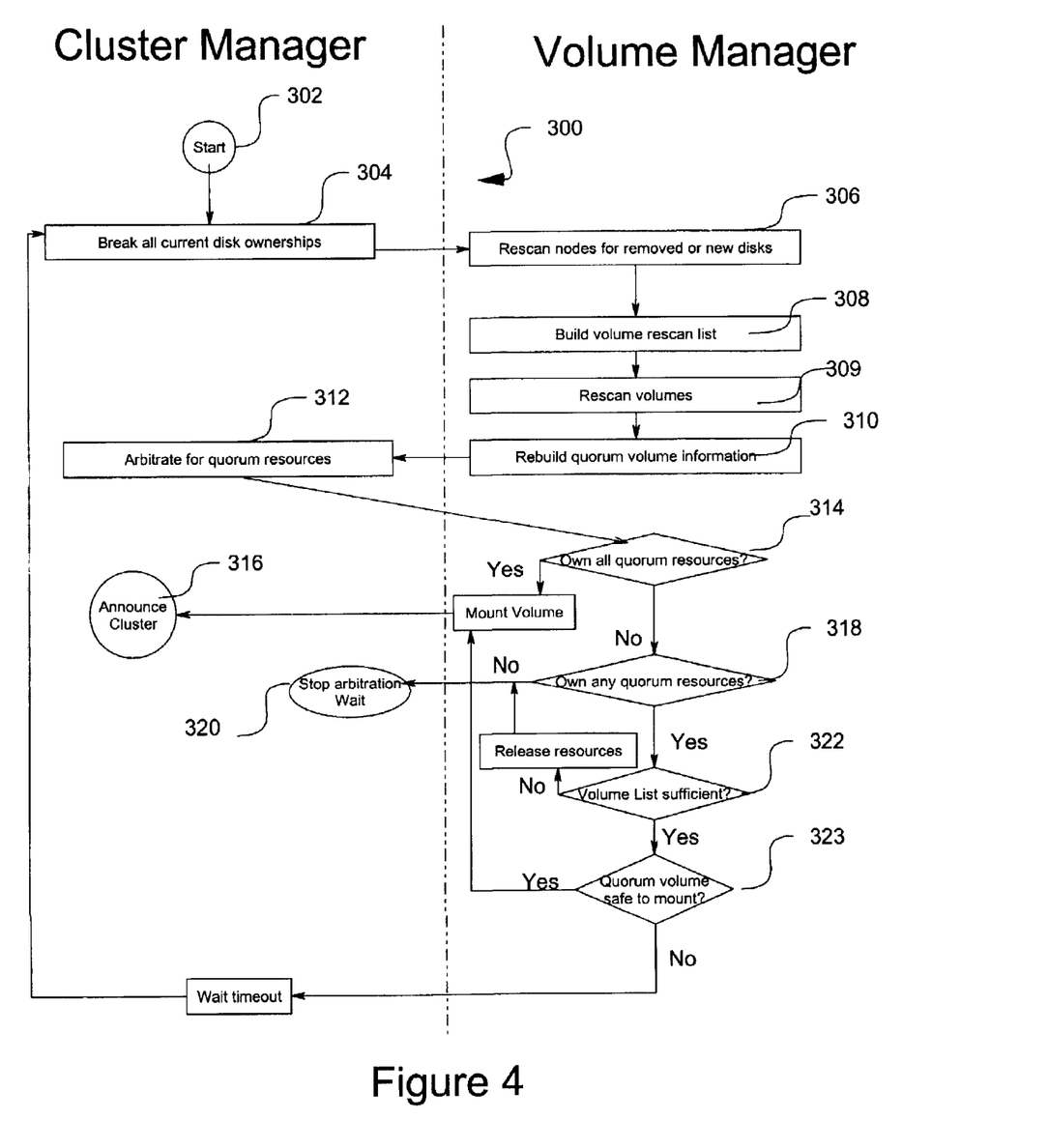
FIG. 4 is a flowchart illustrating one mode of operation of the software system of FIG. 3 in which the system arbitrates for logical quorum resources according to the invention.

FIG. 4 illustrates how the present invention cleanly separates the responsibilities of cluster management from the responsibility of volume management. More specifically, arbitration cycle 300 illustrates one embodiment of the inventive transformation arbitration method as performed by cluster manager 202 and volume manager on each node of storage network 100. Arbitration cycle 300 is invoked when storage network 100 has not yet been established, such as when either node 105 or 110 is the first to boot, or anytime storage network 100 had been previously formed but communication between the nodes 105 and 110 has broken down.

The arbitration cycle 300 can be initiated by either node 105 or node 110 by proceeding from block 302 to block 304.

In block 304, cluster manager 202 (FIG. 3) terminates all current ownership of storage subsystem 106. In one embodiment this is accomplished by resetting bus 112. This action in turn forces all the other nodes of the storage network 100 to perform arbitration cycle 300 and places all volumes of into an off-line mode. In this mode, volume manager 204 blocks all access storage subsystem 106. In one embodiment the arbitrating nodes wait a predetermined delay period before proceeding with arbitration cycle 300 in order to ensure that all nodes of storage network 100 have entered arbitration.

In block 306, cluster manager 202 instructs volume manager 204 to scan all other nodes within storage network 100 in order to update configuration information for each new or removed storage device 106. At the end of block 306 the configuration information maintained by volume manager 204 is only partially complete because those that were owned by other nodes may have been changed. Thus, in block 308, cluster manager 202 instructs volume manager 204 to generate a list that identifies those storage subsystem 106 that were previously owned by nodes of storage network 100.

In block 309 volume manager 204 reads and processes volume information from each storage device 106 of the generated list. Volume manager 204 rebuilds an internal configuration database. This action ensures that the arbitrating node discovers the quorum resource for storage network 100 even if the quorum resource was owned entirely by a different node prior to arbitration cycle 300. At the conclusion of block 309, volume manager 204 has information regarding all storage subsystem 106 and all volumes thereon.

Next, in block 310 cluster manager 202 requests that volume manager 204 identify all physical quorum resources 111 associated with the quorum volume. The volume manager 204 determines all storage subsystem 106 having physical quorum resources 111 and rebuilds quorum volume information for storage network 100. For example, referring to FIG. 1 volume manager 204 identifies storage device 108 and 109 as necessary for ownership to ensure that a volume may be brought online. At the completion of block 310, quorum volume information is consistent for all nodes of storage network 100. At this point cluster manager 202 attempts to take ownership of storage devices 108 and 109.

In block 312, cluster manager 202 invokes conventional arbitration techniques provided by bus 112, such as techniques specified by the SCSI protocol, in order to arbitrate for the physical quorum resources, i.e., storage devices 108 and 109. At the conclusion of these conventional mechanisms, either node 105 or 110 may own both storage devices 108 and 109 or the ownership of physical quorum resources 111 may be split due to race conditions present in the conventional arbitration techniques.

After arbitration for physical quorum resources 111 has completed, volume manager 204 determines whether the local node, i.e. the node upon which cluster manager 202 is running, has successfully acquired ownership of both storage devices 108 and 109 necessary for the quorum volume. If so, volume manager 204 mounts the quorum volume and, in block 316, cluster manager 202 declares the local node to be the cluster master and informs the other nodes that storage network 100 has been formed. At this point, the other nodes terminate arbitration and join storage network 100.

If the local node does not have ownership of both storage devices 108 and 109, volume manager 204 proceeds from block 314 to block 318 and determines whether the local node has acquired ownership of any quorum volume resources, i.e., either storage device 108 or 109. If the local node does not have ownership of either then control passes to cluster manager 202 which, in block 320, terminates arbitration and waits for communication from another node that ultimately becomes the cluster master.

If the arbitrating node has ownership of one but not both storage devices 108 and 109, then volume manager 204 proceeds from block 318 to block 322 and determines whether the volume list is sufficient to form a quorum. Volume manager may use several different algorithms in determining whether the volume list is suitable such as a simple majority or a weighted voting scheme. If the volume list is not sufficient then volume manager 204 releases any quorum resources. Cluster manager 202 proceeds to block 320 and waits for communication from another node that ultimately becomes the cluster master.

If, however, volume manager 204 determines that the volume list is sufficient then volume manager 204 proceeds from block 322 to block 323 and determines whether it is safe to mount the quorum volume. This determination is based on volume specific information. For example, if the quorum volume uses concatenated or striped extents then volume manager 204 will always determine it unsafe to mount the quorum volume when only one extent is owned. As another example, when the quorum volume is a RAID V, then volume manager 204 may apply a "minus one" algorithm such that all but one of the extents are required. In addition, volume manager 204 may apply user selectable criteria. For example, if the quorum volume is a mirror then the user may configure volume manager 204 to require all extents or to require a simple majority. If volume manager 204 can safely mount the quorum volume then volume manager 204 mounts the quorum volume and cluster manager 202 proceeds to block 316 and declares the local node the cluster master.

If, however, the volume manager 204 determines that it cannot safely mount the quorum volume, cluster manager 202 waits a predetermined amount of time. If in block 326 communication is not received from a cluster master within that time, cluster manager 202 jumps back to block 304 and repeats the inventive arbitration method. In one embodiment, the delay period increases with each iteration of arbitration cycle 300.

Conclusion

Various embodiments of the inventive arbitration scheme have been described that allow cluster software to arbitrate for logical quorum resource without requiring knowledge of volume management and the physical characteristics that underlie the formation of the logical resource. The volume management software manages the underlying storage devices without having knowledge of how ownership of the cluster is established via the arbitration process. In this manner, the present invention cleanly separates the responsibilities of cluster management from the responsibility of volume management. It is intended that only the claims and equivalents thereof limit this invention.

We claim:

1. In a system that includes a plurality of computing nodes and a storage subsystem that includes physical quorum resources contained within one or more storage devices, a method for forming a storage network in which the physical quorum resources can be utilized by the computing nodes of the storage network, the method for forming a storage network comprising:

an act of terminating any current ownership over the physical quorum resources of the storage subsystem by each of the computing nodes in the system;

an act of scanning each other computing node in the system to update configuration information for a new storage network;

an act of invoking arbitration techniques to determine ownership of the physical quorum resources by one or more of the computing nodes; and an act of mounting a quorum volume comprising the physical quorum resources to the storage network.

2. A method as recited in claim 1, wherein the acts of terminating current ownership and invoking arbitration are performed by a first module and wherein the acts of scanning each other computing node and mounting a quorum volume are performed by a second module that is different than the first module.

3. A method as recited in claim 1, wherein the act of terminating current ownership includes blocking access to the storage subsystem.

4. A method as recited in claim 1, wherein the act of terminating current ownership includes resetting a bus of each computing node.

5. A method as recited in claim 1, wherein the act of terminating current ownership includes waiting a predetermined period of delay prior to invoking arbitration techniques.

6. A method as recited in claim 1, further including an act of generating a list that identifies each storage device in the storage subsystem that includes physical quorum resources that were owned by the computing nodes of the storage network.

7. A method as recited in claim 6, further including an act of processing volume information from each storage device contained in the generated list to rebuild an internal configuration database.

8. A method as recited in claim 1, wherein the act of mounting the quorum volume is only performed when a computing node has acquired ownership of all storage devices necessary for a quorum volume.

9. A method as recited in claim 1, wherein the act of mounting the quorum volume is only performed when a computing node has acquired ownership of a majority of the physical quorum resources.

10. A method as recited in claim 1, wherein the quorum volume includes one or more of concatenated and striped extents, and wherein the act of mounting the quorum volume is only performed when ownership is obtained for more than one of the concatenated and striped extents.

11. A method as recited in claim 1, wherein the quorum volume includes one or more of concatenated and striped extents, and wherein the act of mounting the quorum volume is only performed when ownership is obtained for a simple majority of the one or more concatenated and striped extents.

12. A computer program product for use in a system that includes a plurality of computing nodes and a storage subsystem that includes physical quorum resources contained within one or more storage devices, the computer program product comprising:

a computer readable media having computer-executable instructions for implementing a method for forming a storage network in which the physical quorum resources can be utilized by the computing nodes of the storage network, the method for forming a storage network including:

an act of terminating any current ownership over the physical quorum resources of the storage subsystem by each of the computing nodes in the system;

an act of scanning each other computing node in the system to update configuration information for a new storage network;

an act of invoking arbitration techniques to determine ownership of the physical quorum resources by one or more of the computing nodes; and an act of mounting a quorum volume comprising the physical quorum resources to the storage network.

13. A computer program product as recited in claim 12, wherein the acts of terminating current ownership and invoking arbitration are performed by a first module and wherein the acts of scanning each other computing node and mounting a quorum volume are performed by a second module that is different than the first module.

14. A computer program product as recited in claim 12, wherein the act of terminating current ownership includes blocking access to the storage subsystem.

15. A computer program product as recited in claim 12, wherein the act of terminating current ownership includes resetting a bus of each computing node.

16. A computer program product as recited in claim 12, wherein the act of terminating current ownership includes waiting a predetermined period of delay prior to invoking arbitration techniques.

17. A computer program product as recited in claim 12, wherein the method further includes an act of generating a list that identifies each storage device in the storage subsystem that includes physical quorum resources that were owned by the computing nodes of the storage network.

18. A computer program product as recited in claim 17, wherein the method further includes an act of processing volume information from each storage device contained in the generated list to rebuild an internal configuration database.

19. A computer program product as recited in claim 12, wherein the act of mounting the quorum volume is only performed when a computing node has acquired ownership of all storage devices necessary for a quorum volume.

20. A computer program product as recited in claim 12, wherein the act of mounting the quorum volume is only performed when a computing node has acquired ownership of a majority of the physical quorum resources.

21. A computer program product as recited in claim 12, wherein the quorum volume includes one or more of concatenated and striped extents, and wherein the act of mounting the quorum volume is only performed when ownership is obtained for more than one of the concatenated and striped extents.

22. A computer program product as recited in claim 12, wherein the quorum volume includes one or more of concatenated and striped extents, and wherein the act of mounting the quorum volume is only performed when ownership is obtained for a simple majority of the one or more concatenated and striped extents.

* * * * *

UNITED STATES PATENT AND TRADEMARK OFFICE
CERTIFICATE OF CORRECTION

PATENT NO. : 6,615,256 B1
DATED : September 2, 2003
INVENTOR(S) : van Ingen et al.

It is certified that error appears in the above-identified patent and that said Letters Patent is hereby corrected as shown below:

Column 2,
Line 11, after "devices" please delete "is often"

Column 8,
Line 5, after "volumes" please delete "of"

Signed and Sealed this

Twenty-fifth Day of May, 2004

JON W. DUDAS
*Acting Director of the United States Patent and Trademark Office*